United States Patent [19]

Logan

[11] Patent Number: 5,434,828

[45] Date of Patent: Jul. 18, 1995

[54] STABILIZER FOR GEOPHONE

[75] Inventor: Roger M. Logan, Houston, Tex.

[73] Assignee: Western Atlas International, Inc., Houston, Tex.

[21] Appl. No.: 129,955

[22] Filed: Sep. 30, 1993

[51] Int. Cl.6 .......................... G01V 1/38; G01V 1/00
[52] U.S. Cl. ...................................... 367/188; 367/173
[58] Field of Search .................. 181/122, 401, 402; 367/188, 178, 15, 12, 165, 173, 16, 17, 18, 14

[56] References Cited

U.S. PATENT DOCUMENTS

| | | | |
|---|---|---|---|
| 3,223,194 | 12/1965 | Michael | 367/178 |
| 3,704,764 | 12/1972 | Henderson | 367/188 |
| 3,793,623 | 2/1974 | Gongwer | 367/173 |
| 4,694,435 | 9/1987 | Magneville | 367/17 |
| 4,813,029 | 3/1989 | Erich, Jr. et al. | 367/188 |
| 5,007,031 | 4/1991 | Erich, Jr. | 367/178 |

Primary Examiner—Ian J. Lobo
Attorney, Agent, or Firm—Elizabeth W. Layman

[57] ABSTRACT

This invention provides a stabilizer for a geophone which reduces the amount of movement of the geophone after deployment in a marine environment subjected to water currents or turbulence. The stabilizer consists of a bulb-shaped body with fin-shaped lobes. An axial cavity for receiving the geophone housing containing the geophone is located at one end of the stabilizer. The other end terminates in a tail designed to promote laminar flow and reduce turbulence coming off the geophone housing and stabilizer. When the geophone is deployed, the stabilizer and attached geophone housing come to rest on a stable, 3-prong base comprised of two adjacent lobes of the stabilizer and the end of the geophone housing opposite the end inserted into the stabilizer.

4 Claims, 2 Drawing Sheets

STABILIZER FOR GEOPHONE

BACKGROUND OF THE INVENTION

1. Field of the Invention

This invention relates generally to the use of seismic sensors in geophysical exploration and more particularly to an apparatus for stabilizing a seismic sensor used in a marine environment.

2. Description of the Related Art

In geophysical exploration, an acoustic signal is generated by a seismic source into the earth. The signal propagates through the earth in the form of a wave front which encounters structural changes in the earth. Part of the wavefront is reflected back to the earth's surface and detected by acoustic sensors such as geophones. The data is relayed from the geophones to seismic processing systems to obtain geophysical information about the substrata.

Geophones can be used on land, in shallow water and in marsh land and normally are magnetic-type geophones containing a magnet and a coil. Either the magnet or the coil is attached to the geophone housing and the other element is freely suspended from the housing. Relative motion between the coil and the magnet produces an electromotive force which produces an electrical signal that is proportional to the velocity of the motion.

When a geophone is used in a marine environment, it often is housed in a cylinder and is either trunnion or gimbal-mounted to maintain a vertical or near-vertical orientation when deployed as required for optimal results. Geophones are very sensitive to mechanical vibrations or motion and generate an unacceptable level of noise when moved by flowing water or the turbulence associated with that flow. Current geophones frequently become unstable when subjected to currents such as those caused by marine tidal action.

The present invention addresses the above-noted problem and provides apparatus for stabilizing geophones in a marine environment which reduces the noise problems created by marine tidal action.

SUMMARY OF THE INVENTION

This invention is a device which stabilizes the geophone housing when subjected to currents such as those caused by marine tidal action. The invention is a multi-lobed, streamlined bulb which is attached to one end of the geophone housing. When deployed, two of the lobes of the stabilizer and the second end of the housing provide three points upon which the apparatus rests. This configuration provides stabilization of the geophone housing which reduces the amount of noise generated by flowing water or the turbulence associated with that flow.

Examples of the more important features of the invention thus have been summarized rather broadly in order that the detailed description that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein.

DETAILED DESCRIPTION OF THE PREFERRED EMBODIMENT

Figure 1:
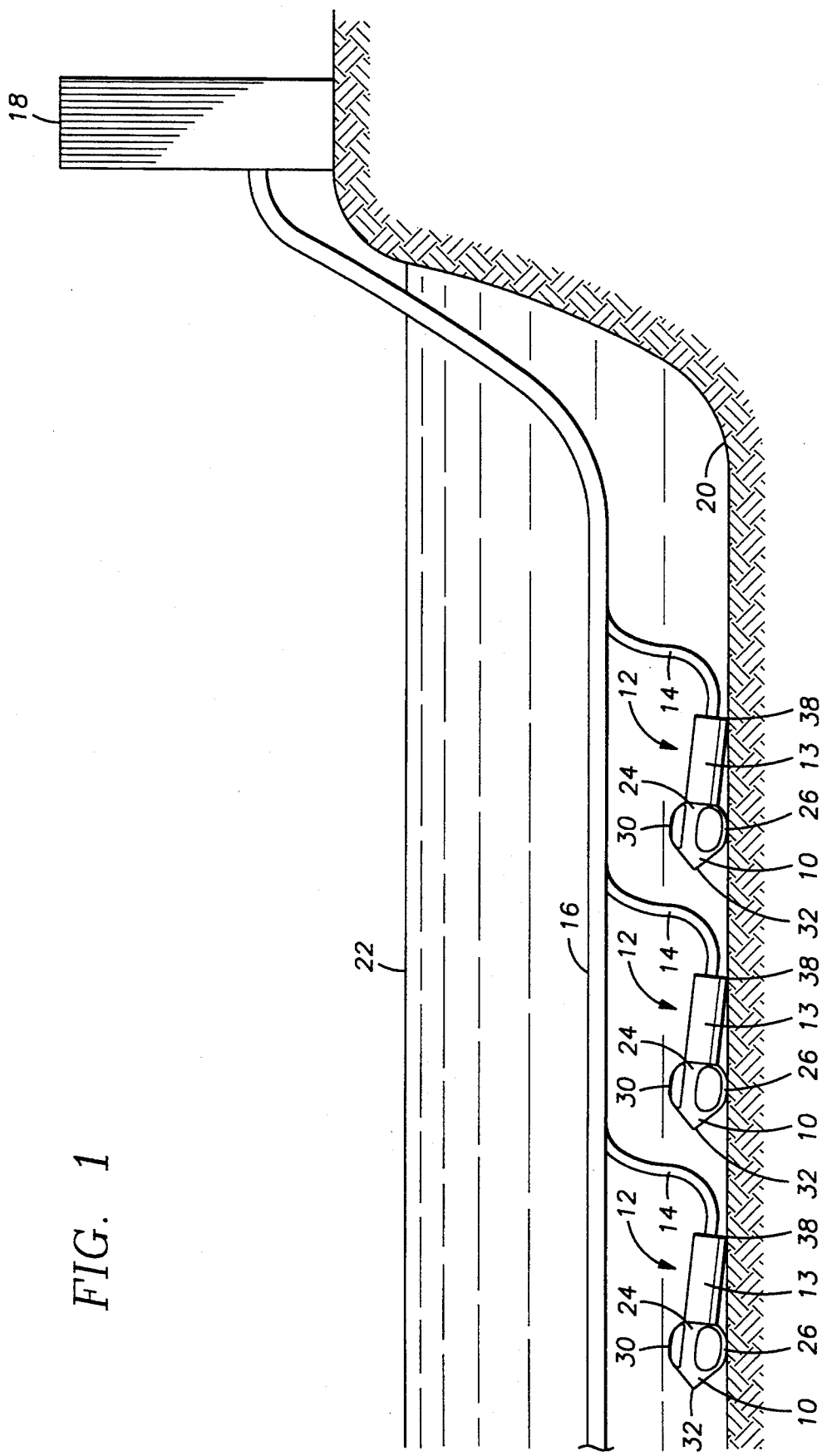
FIG. 1 shows an elevation view of the invention deployed in a marine environment.

FIG. 1 shows an elevation view of a plurality of stabilizers 10 in use with geophones enclosed in individual geophone housings 13 and attached via cables 14 to a seismic cable 16. The geophones 12 are deployed beneath the surface 22 of the water along the bottom 20 of the marine environment being surveyed. Seismic signals are received by the geophones 12 and transmitted via the cables 14 through the seismic cable 16 to an onshore receiver 18 for processing.

Figure 2:
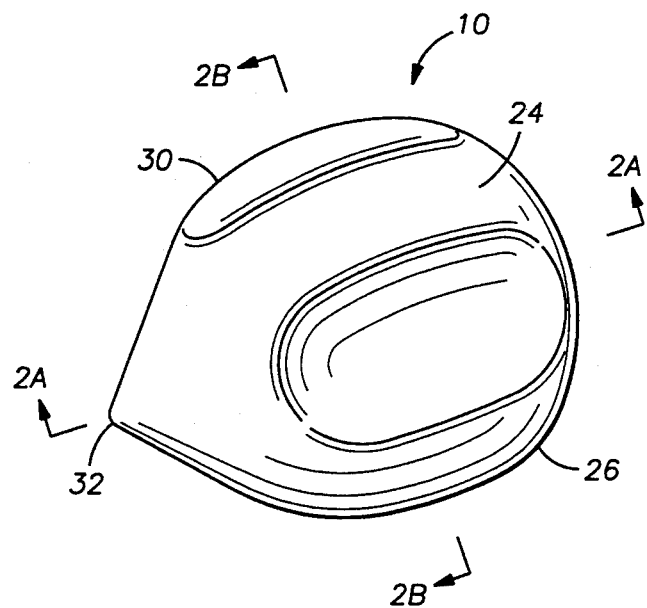
FIG. 2 shows a perspective view of one preferred embodiment of the apparatus.

FIG. 2 shows a perspective view of the geophone stabilizer 10. The stabilizer 10 includes four fin-shaped lobes (three of which are shown as 24, 26 and. 30) and a tail 32.

Figure 2A:
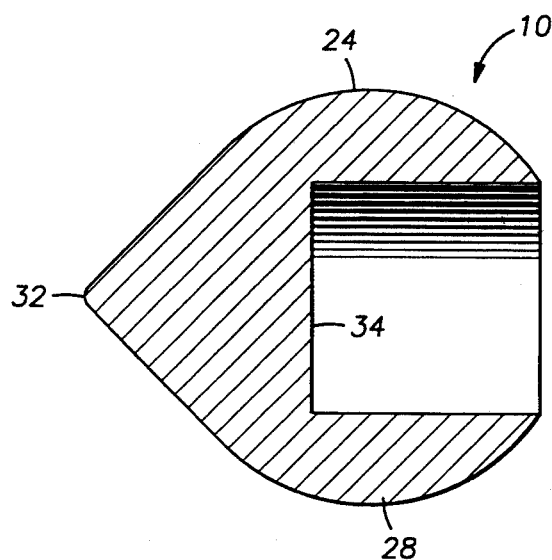
FIG. 2A shows a cross-sectional view of the apparatus along line A—A' of FIG. 2.

As shown in the side cross-sectional view in FIG. 2A, the stabilizer 10 contains a cavity 34 at the end opposite the tail 32. The cavity 34 is adapted to receive the cylinder-shaped housing 13 (FIG. 1). Two of the lobes 24 and 28 also are shown in FIG. 2A.

Figure 2B:
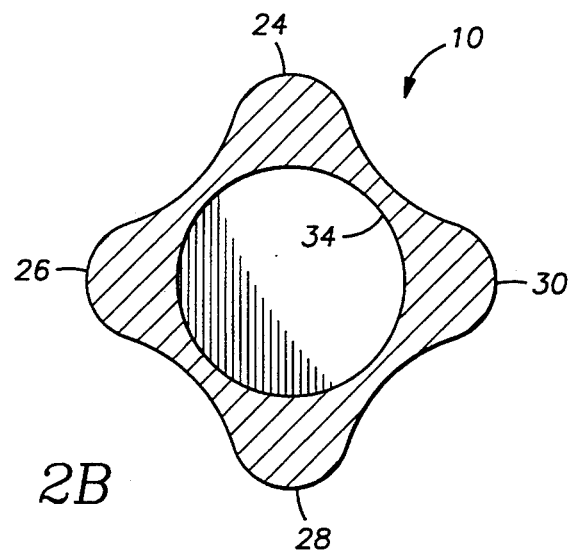
FIG. 2B shows a cross-sectional view of the apparatus along line B—B' of FIG. 2.

FIG. 2B shows an end cross-sectional view of the stabilizer 10 showing the cavity 34 and the four lobes 24, 26, 28 and 30.

In operation, the geophone housing 13 is positioned inside the cavity 34 of the stabilizer 10 such that the housing does not rotate within the stabilizer 10 but rather becomes integral with the stabilizer 10. The geophone 12 (FIG. 1) is then deployed along the bottom surface 20 of the marine area being surveyed.

When seismic exploration is being conducted in a marine environment, currents exert force on the geophone housing 13. The cylindrical shape of the housing 13 promotes a rolling action of the geophone 12 resulting in noise which distorts the seismic signals. In the preferred embodiment, the cable end 38 (FIG. 1) of the housing 13 and two adjacent lobes (24 and 26; 26 and 28; 28 and 30; or 30 and 24) (FIG. 2B) of the stabilizer 10 form a 3-pronged base which rests on the bottom surface 20 and inhibits movement of the geophone housing 13 when forces from currents, or turbulence caused by the currents, flow over the housing 13.

The tail 32 of the stabilizer 10 has a tapered end. When deployed with the tapered end as the trailing edge with respect to currents, the tail 32 promotes laminar flow and reduces turbulence coming off the stabilizer 10. The cavity 34 is shaped to receive the cylindrically shaped housing 13 and hold the housing 13 such that it will not rotate within the stabilizer 10.

The stabilizer 10 in the preferred embodiment is made of brass or bronze. This is meant by way of example and is not meant to limit the materials used for the stabilizer 10. Any non-corrosive material with adequate density (weight) can be used. Tests using various materials indicated that the heavier materials such as brass or bronze were more effective in inhibiting motion of the housing 13 than materials such as aluminum or plastic.

An alternative embodiment (not shown) of the invention is a geophone housing/stabilizer combination manufactured as an integral structure.

The foregoing description is directed to two preferred embodiments of the present invention for the purpose of illustration and explanation. It will be apparent, however, to one skilled in the art that many modifications and changes to the embodiments set forth above are possible without departing from the scope of the invention. It is intended that the following claims be interpreted to embrace all such modifications and changes.

I claim:

1. An apparatus for use with a geophone housing wherein said apparatus comprises a body having an axial cavity adapted to receive said geophone housing and at least three lobes extending from and positioned around the periphery of said body to provide rotational stability with a three-point base formed by two adjacent lobes of said body and an end of said geophone housing when said apparatus with attached geophone housing is placed on a surface.

2. A stabilizer for use with a geophone housing, said stabilizer comprising a body having:
   (a) an axial cavity at a first end adapted to receive said geophone housing;
   (b) at least three lobes extending from and positioned around the periphery of said body to provide rotational stability with a three-point base formed by two adjacent lobes of said body and an end of said geophone housing when said apparatus is placed on a surface; and
   (c) a tail section extending from a second end of said body, wherein said tail section is tapered.

3. The apparatus of claim 2, wherein said stabilizer is made of a relatively heavy, non-corrosive material.

4. The apparatus of claim 2, wherein said lobes are fin-shaped.

* * * * *

UNITED STATES PATENT AND TRADEMARK OFFICE
CERTIFICATE OF CORRECTION

PATENT NO. : 5,434,828
DATED : July 18, 1995
INVENTOR(S) : Roger M. Logan

It is certified that error appears in the above-indentified patent and that said Letters Patent is hereby corrected as shown below:

Column 2, line 16: please insert --12-- after "geophones" and before "enclosed."

Signed and Sealed this

Second Day of July, 1996

Attest:

BRUCE LEHMAN

Attesting Officer

Commissioner of Patents and Trademarks